United States Patent
Nylander et al.

(10) Patent No.: US 9,332,498 B2
(45) Date of Patent: May 3, 2016

(54) ENERGY EFFICIENT BASE STATION ENTERING SLEEP MODE

(75) Inventors: Tomas Nylander, Värmdö (SE); Johan Rune, Lidingö (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 920 days.

(21) Appl. No.: 13/379,609

(22) PCT Filed: Jun. 24, 2009

(86) PCT No.: PCT/SE2009/050805
§ 371 (c)(1),
(2), (4) Date: Dec. 20, 2011

(87) PCT Pub. No.: WO2010/151186
PCT Pub. Date: Dec. 29, 2010

(65) Prior Publication Data
US 2012/0106423 A1  May 3, 2012

(51) Int. Cl.
*H04W 24/02* (2009.01)
*H04W 52/02* (2009.01)
*H04M 15/00* (2006.01)
*H04W 68/02* (2009.01)
*H04W 84/04* (2009.01)
*H04W 76/04* (2009.01)

(52) U.S. Cl.
CPC ...... *H04W 52/0241* (2013.01); *H04M 15/7657* (2013.01); *H04W 24/02* (2013.01); *H04W 52/0206* (2013.01); *H04W 68/02* (2013.01); *H04W 76/048* (2013.01); *H04W 84/045* (2013.01); *Y02B 60/34* (2013.01); *Y02B 60/50* (2013.01)

(58) Field of Classification Search
CPC .......... H04W 52/0206; H04W 84/045; H04W 24/02; Y02B 60/50; Y02B 60/34; H04J 14/0227; H04M 15/7657
See application file for complete search history.

(56) References Cited

U.S. PATENT DOCUMENTS 6,584,330 B1 * 6/2003 Ruuska ............. H04W 52/0206
455/423
7,567,791 B2   7/2009 Laroia et al.
(Continued)

FOREIGN PATENT DOCUMENTS

CN    101006664 A    7/2007
CN    101179814 A    5/2008
(Continued)

OTHER PUBLICATIONS

3GPP document, "TS 36.300 v.8.8.0", Apr. 2009, pp. 1-159.*
(Continued)

*Primary Examiner* — Andrew Chriss
*Assistant Examiner* — Salvador E Rivas
(74) *Attorney, Agent, or Firm* — Murphy, Bilak & Homiller, PLLC

(57) ABSTRACT

The basic idea of the present invention is to let the base station enter a low-power, low-radiation cycle, the so called "sleep mode", when there are no UEs using it and to introduce methods to "wake up" the base station from this state when there is a UE in the vicinity which is allowed to access the base station and which may need it on short notice.

28 Claims, 10 Drawing Sheets

(56) References Cited

U.S. PATENT DOCUMENTS

| | | | |
|---|---|---|---|
| 2003/0193964 A1* | 10/2003 | Bae | H04W 76/028 370/465 |
| 2005/0049012 A1 | 3/2005 | Chang et al. | |
| 2006/0039320 A1 | 2/2006 | Kang et al. | |
| 2006/0099950 A1* | 5/2006 | Klein | H04W 36/12 455/439 |
| 2007/0066273 A1* | 3/2007 | Laroia | H04W 52/0235 455/343.2 |
| 2007/0183427 A1 | 8/2007 | Nylander et al. | |
| 2008/0045224 A1* | 2/2008 | Lu | H04W 72/005 455/446 |
| 2008/0267148 A1* | 10/2008 | Speight | H04W 52/0225 370/338 |
| 2008/0267153 A1* | 10/2008 | Mukherjee | H04L 63/104 370/338 |
| 2009/0005127 A1* | 1/2009 | Frenger | H04W 52/28 455/574 |
| 2009/0036050 A1* | 2/2009 | Min | H04W 52/46 455/7 |
| 2009/0252073 A1* | 10/2009 | Kim | H04W 52/0206 370/311 |
| 2009/0310527 A1* | 12/2009 | Rao | H04W 92/20 370/315 |
| 2010/0056184 A1* | 3/2010 | Vakil | H04W 4/02 455/456.5 |
| 2010/0165917 A1* | 7/2010 | Ishida | H04W 36/0005 370/328 |
| 2010/0246501 A1* | 9/2010 | Prakash | H04W 24/08 370/329 |

FOREIGN PATENT DOCUMENTS

| | | |
|---|---|---|
| CN | 101438510 A | 5/2009 |
| DE | 102005051291 A1 | 5/2007 |
| EP | 1511335 A2 | 3/2005 |
| EP | 2056628 A1 | 5/2009 |
| WO | 02/07464 A1 | 1/2002 |
| WO | 2004/075583 A1 | 9/2004 |

OTHER PUBLICATIONS

Author Unknown, "Dynamic Setup of HNBs for Energy Savings and Interference Reduction," Mitsubishi Electric; 3GPP TSG RAN WG3 Meeting #61; R3-081949; Aug. 18-22, 2008. pp. 1-7. Jeju Island, Korea.

Carstens, J. "A Method for Interference Control and Power Saving for Home Access Point." ip.com Prior Art Database, Technical Disclosure, (c) Nokia Siemens Networks 2007, ip.com No. IPCOM000160756D, Dec. 13, 2007.

3rd Generation Partnership Project. "Dynamic Setup of HNBs for Energy Savings and Interference Reduction." 3GPP TSG RAN WG3 Meeting #59bis, R3-080658, Shenzhen, China, Mar. 31-Apr. 3, 2008.

3rd Generation Partnership Project. "HeNB's S1 Simplification by Means of HeNB GW." 3GPP TSG RAN WG3 Meeting #59, R3-080155, Sorrento, Italy, Feb. 11-15, 2008.

* cited by examiner

ENERGY EFFICIENT BASE STATION ENTERING SLEEP MODE

TECHNICAL FIELD

The present invention relates to methods and arrangements in a cellular telecommunication system for interference reduction and energy saving.

BACKGROUND

In third generation (3G) Universal Mobile Telecommunications Systems (UMTS) and in particular in its evolved version System Architecture Evolution/Long Term Evolution (SAE/LTE), also referred to as Evolved Packet System (EPS), the concept of home base stations is introduced. In 3G, a home base station is referred to as a Home Node B (HNB) whereas in EPS it is referred to as a Home eNodeB (HeNB). A cell served by a HNB or a HeNB is commonly referred to as a femtocell. A home base station is assumed to be placed in a private home, utilizing the home owner's fixed broadband connection to access the core network. It is also assumed that the home owner handles the actual physical installation of the home base station. Hence, the deployment of home base stations cannot be planned, since it is largely outside the control of the operator. Another important property of the home base station concept is the potentially very large number of home base stations.

In the further description a 3G Home Node B is abbreviated HNB, an EPS/LTE Home eNodeB is abbreviated HeNB and the abbreviation HN is used to denote either a 3G Home Node B or an EPS/LTE Home eNodeB.

A HN connects to the operator's network via a secure tunnel (supposedly IPsec protected) to a security gateway at the border of the operator's network. Via this tunnel the HN connects to the core network nodes of the operator's core network. The 3GPP operator may also deploy a concentrator node in its core network between the HNs and the regular core network nodes. (3GPP ($3^{rd}$ Generation Partnership Project) is a standardization body which specifies the standards for 3G/UMTS and EPS/SAE/LTE. A 3GPP operator is an operator which operates a telecommunication system implementing one or more of the 3GPP standards.) In the EPS standardization such a concentrator node is commonly referred to as a HeNB Gateway, which may be an optional node in EPS HeNB solutions. The corresponding node name in 3G UMTS standardization is HNB Gateway and this node is mandatory in 3G HNB systems. In this specification both HNB Gateways and HeNB Gateways may also be referred to as HN Gateways.

For both EPS and 3G UMTS the HN uses a broadband access network (e.g. Digital Subscriber Line technology (xDSL), Cable) as part of the transport network. Through this setup a mobile terminal, also known as user equipment (UE), communicates via the HN and the core network like any other UE.

The HN concept is closely related to the concept of Closed Subscriber Group (CSG). A femtocell is also assumed to be a CSG cell. This means that only a selected group of subscribers are allowed to access the network through that cell. The CSG of a CSG cell is identified by a CSG ID, which is broadcast in the cell as a part of the system information. Typically each CSG cell has its own unique CSG ID but it is also possible to define the same CSG ID for multiple cells, thereby forming a CSG zone, in which the same selected group of subscribers is allowed access. Although a CSG cell in principle does not have to be a femtocell, the two terms are often used as synonyms.

Hence, all subscribers are not allowed to access a certain HN and a certain subscriber is not allowed to access all HNs. Under supervision of the operator the owner of a HN (or the administrator of the CSG(s) associated with the cell(s) served by the HN) defines which subscribers are allowed to access a femtocell (CSG cell) of the HN (i.e. which subscribers that are included in the CSG of the femtocell). This is assumedly done through a web interface (or other "interface" between the HN owner and the operator), and the CSG data (or HN access list (which is an equivalent term assuming that the HN only serves one CSG)) is stored in a database in the operator's network. The HN owner would assumedly enter the allowed subscribers in the form of ISDN (Integrated Services Digital Network) numbers (MSISDN, Mobile Subscriber ISDN Number) or IMSIs (International Mobile Subscriber Identities) of the concerned subscribers.

The search for allowed CSG cells is not governed by the network, but is left to the UE to handle autonomously. To identify an allowed CSG cell the UE must read the CSG ID from the system information broadcast in the cell and compare it with the CSG ID(s) stored in a list referred to as CSG Whitelist or Allowed CSG List. When a match is found the UE has discovered an allowed CSG cell. To make the search for an allowed CSG cell more efficient the UE is assumed to utilize a so-called "fingerprint" of the CSG cell location. The exact mechanisms of such a fingerprint aided cell search are not standardized and will be up to each UE vendor to design. However, e.g. a fingerprint is obtained by listening to transmissions from the macrocells (i.e. regular cells which typically are much larger than femtocells) in the area of the allowed CSG cell. Transmissions from both LTE cells, 3G cells and 2G cells may be utilized to form a "signature"/ "fingerprint" of the location of the CSG cell. Transmitted data that may be useful indications include e.g. cell identities (E-CGI (Evolved UMTS Terrestrial Radio Access Network (E-UTRAN) Cell Global Identity) in EPS and CGI (Cell Global Identity) in 2G/3G), registration area identifiers, such as Tracking Area Identities (TATs) in EPS, Location Area Identities (LAIs) and Routing Area Identities (RAIs) in 2G/3G and UTRAN Registration Area (URA) identities in 3G. Other types of radio transmissions could potentially also be used to provide input data to the fingerprint, e.g. Wireless Local Area Network (WLAN) or Worldwide Interoperability for Microwave Access (WiMAX) transmissions. The UE learns the fingerprint (i.e. records relevant received data which can be used to identify the location) of a CSG cell when it is present in the cell. Later, when searching for the CSG cell (or before searching for the CSG cell) the UE scans the radio environment and when it receives an indication of a fingerprint match (i.e. sufficiently many of the pieces of data constituting the fingerprint match the received ones), the UE determines that it is worthwhile to check the CSG ID of detected potential CSG cells. Also the network may be aware of the fingerprint, e.g. the network may know in which macro tracking area (i.e. a tracking area comprising macrocells) a UE has an allowed CSG cell. The network can have learnt this when the UE accessed the network using a CSG cell.

When many femtocells are deployed in an area these will substantially contribute to the overall radio transmission interference and may degrade the quality of the radio environment in the macrocells as well as the general performance of the cellular system in the area. In particular this is a problem for a UE located close to a HN which it is not allowed to access.

Furthermore, a general trend in the telecommunication business is that, as a result of rising energy prices, the energy consumed by the network equipment represents an increasingly larger part of the cost of running the network. Together with the global environmental trend and the increasing importance for enterprises to have good environmental images, this has caused operators to demand that vendors of infrastructure equipment come up with ways to reduce their equipment's energy consumption.

SUMMARY

Hence, there is a need to develop methods for reduction of interference and energy consumption resulting from radio transmissions from base stations and in particular from home base stations and base stations deployed for capacity reasons that may be unused a large part of the time.

This is solved by letting the base station enter a low-power, low-radiation cycle, the so called "sleep mode", when there are no UEs using it, and by introducing methods to "wake up" the base station from this low-power state when there is a UE in the vicinity which is allowed to access the base station and which may need the base station on short notice.

According to a first aspect a method in an energy efficient base station (EEBS) connected to a mobile telecommunication network via a base station gateway is provided. In the method, it is detected if no UEs allowed to access the EEBS are located in the vicinity of the EEBS, if no UEs are detected a sleep mode is entered. In the sleep mode, the EEBS transmits its reference signal and system information less frequently than during regular operation, and the sleep mode is maintained until an indication is received. The detecting step may comprise the further step of receiving a trigger to initiate a paging for UEs located in an area covered by the EEBS, or the cells or a subset of cells served by the base station. The trigger may be an internal event in the EEBS, e.g. an expiration of a timer or an external event such as receiving a message that the EEBS should wake up from the sleep mode. The UEs are then paged and if no answer is received from UEs allowed to access the EEBS, it is determined that no UEs are detected in vicinity of the EEBS.

According to a second aspect of the present invention, a method in a UE of a mobile telecommunication network is provided. The mobile telecommunication network comprises macro base stations and at least one Energy Efficient Base Station (EEBS). The at least one EEBS is configured to enter a sleep mode, wherein the EEBS transmits its reference signal and system information less frequently than during regular operation, and the UE is allowed to access the at least one EEBS. When the UE is in idle mode the method comprises the step of determining an identity of an EEBS in sleep mode by performing (502) a search for EEBSs that the UE is allowed to access. This can be achieved by:
1) Prolonging the search or intensifying the search by using more frequent search periods compared to regular operation, for detecting the EEBS in sleep mode that the UE is allowed to access such that the identified EEBS is detected.
2) Detecting a fingerprint based on transmissions from base stations indicating that the UE is in the vicinity of an EEBS that the UE is allowed to access followed by performing said prolonged or intensified search such that the identified EEBS is detected.
3) Detecting a fingerprint based on transmissions from base stations indicating that the UE is in the vicinity of an EEBS that the UE is allowed to access, and sending an indication to the mobile telecommunication network that it should wake up the EEBS associated with the determined identity.

When the UE is in connected mode the method comprises the steps of determining an identity of an EEBS in sleep mode by detecting a fingerprint based on transmissions from base stations indicating that the UE is in the vicinity of an EEBS that the UE is allowed to access, and sending an indication to the mobile telecommunication network that it should wake up the EEBS associated with the determined identity.

According to a third aspect a method in a concentration gateway concentrating a plurality of EEBSs is provided. The EEBSs are configured to enter a sleep mode, wherein they transmit their reference signal and system information less frequently than during regular operation. In the method, messages are forwarded to the EEBS, wherein the messages comprise wake up and wake-up cancellation commands.

According to a fourth aspect of the present invention an EEBS is provided. The EEBS is connectable to a mobile telecommunication network via a concentration gateway. The EEBS comprises a processor for detecting if no UEs allowed to access the EEBS are located in the vicinity of the EEBS and a processor for handling sleep mode configured to make the EEBS enter a sleep mode if no UEs are detected, wherein the EEBS is configured to transmit its reference signal and system information less frequently than during regular operation. The EEBS further comprises a processor for handling sleep mode, which is further configured to make the EEBS maintain the sleep mode until an indication is received that the EEBS should wake up.

According to fifth aspect of the present invention a UE of a mobile telecommunication network is provided. The mobile telecommunication network comprises macro base stations and at least one EEBS. The at least one EEBS is configured to enter a sleep mode, in which the EEBS transmits its reference signal and system information less frequently than during regular operation, and the UE is allowed to access the at least one EEBS. The UE comprises a processor for detecting a fingerprint based on transmissions from base stations indicating that the UE is in the vicinity of an EEBS that the UE is allowed to access. The UE further comprises a processor for performing a search for EEBSs that the UE is allowed to access, by prolonging the search or intensifying the search compared to regular operation, for detecting an EEBS in sleep mode that the UE is allowed to access and a processor for determining an identity of the detected EEBS in sleep mode, and a transmitter for sending an indication to the mobile telecommunication network that it should wake up the EEBS associated with the determined identity.

According to sixth aspect of the present invention, a concentration gateway (CG) adapted to concentrate a plurality of Energy Efficient base stations (EEBS) in a mobile telecommunication network is provided. Access to an EEBS may be restricted to a limited group of users and the EEBSs are configured to enter a sleep mode, wherein the EEBSs transmit their reference signal and system information less frequently than during regular operation. The concentration gateway comprises at least one transceiver for forwarding messages to the EEBSs comprising wake up and wake-up cancellation commands.

An advantage with embodiments of the present invention is that they allow unused base stations such as base stations deployed for capacity reasons, Home eNodeBs and Home Node Bs to enter a low-power mode, thereby saving energy and reducing the interference level in the cellular network. This reduces energy costs and environmental impacts due to energy production as well as increases the performance of the network. The inventive solution enables efficient control of when a base station should enter a low-power mode and when it should resume regular operation.

DETAILED DESCRIPTION

Figure 1A:
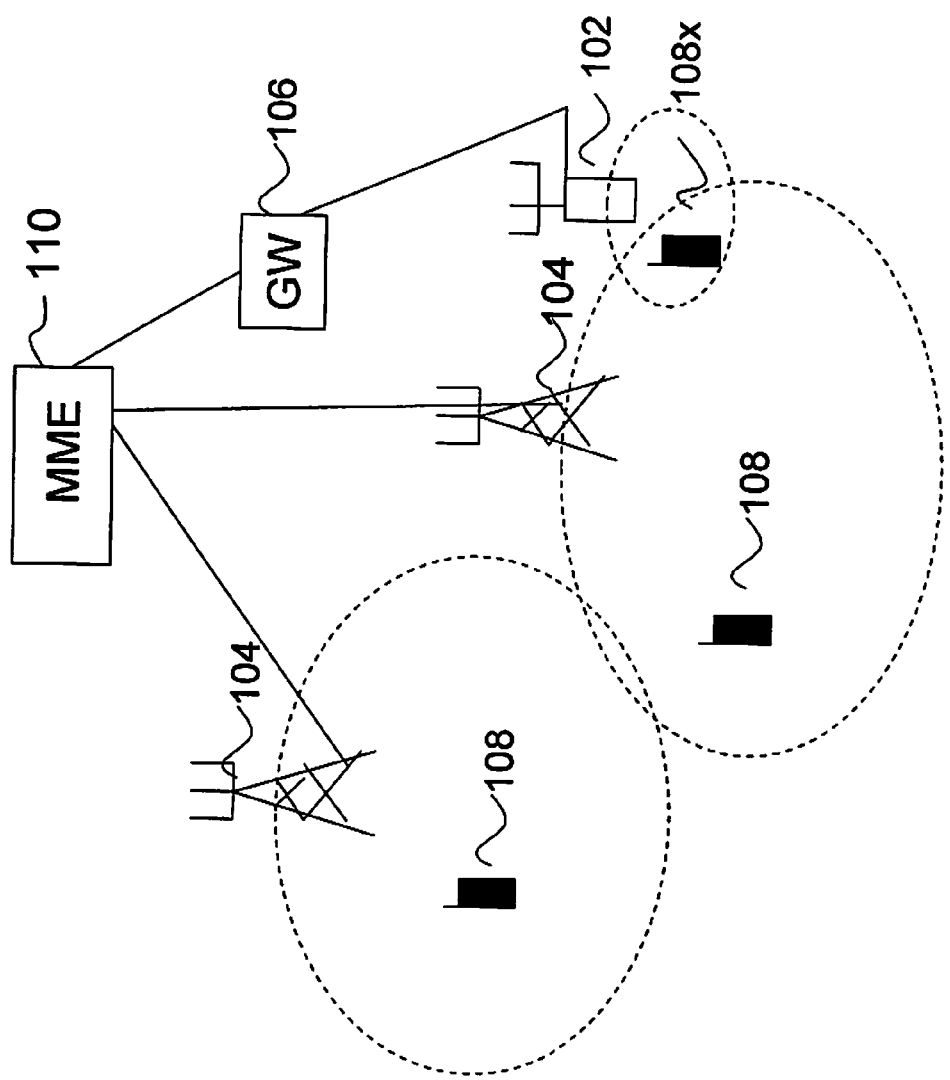
FIGS. 1a and 1b illustrate a cellular telecommunication network wherein the embodiments of the present invention may be implemented.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

For the purpose of simplifying the description of the embodiments of the present invention, the term "energy efficient base station" is introduced. An energy efficient base station is a base station which employs one or several or parts of the embodiments of the present invention. Since the embodiments of the present invention can be applied to several types of base stations, the term energy efficient base station can encompass several types of base stations, including e.g. different sizes/capacities, different access modes, different radio access technologies and cellular network technologies and different purposes of deployment. In a typical case an energy efficient base station is a home base station, i.e. a HeNB or a HNB. As previously mentioned the access to a cells served by a HN is typically restricted to a limited group of subscribers, i.e. a Closed Subscriber Group (CSG). However, an energy efficient base station may also serve cells without restricted access, e.g. femtocells used for coverage extension, picocells, microcells and even macrocells and the energy efficient base station may use different radio access technologies, e.g. 3G WCDMA/HSPA or EPS/LTE. In addition, a cell served by a HN may use so-called "hybrid mode", which means that any subscriber can access the cell, but a limited group of subscribers are prioritized. The prioritization can come in various forms. One way of prioritizing is that the prioritized UEs are given prioritized access when the resources in the cell are limited, whereas the other UEs are allowed access only when there are superfluous resources available in the cell. Another way of prioritizing is that the prioritized UEs are given better quality of service (QoS) or are allowed to access a wider range of services than other UEs. Since a typical energy efficient base station is a HN, an energy efficient base station will often be connected to the cellular core network via a HN gateway. However, even energy efficient base stations which are not HNs or whose cells are not access restricted may be connected to the core network via a concentration node, similar to a HN gateway, since the HN gateway concept (or parts of the HN gateway concept) may potentially be reused also in other scenarios. In addition, all cells are open for emergency calls/sessions for all subscribers, which means that a UE which normally is not allowed to access a certain cell can still camp on the cell in a so-called "limited service state", which means that the UE will only be allowed limited service, typically emergency calls/sessions, in the cell. A UE will typically camp on a cell in limited service state only if there is no cell available to the UE where the UE could receive regular service. Henceforth the term energy efficient base station will be abbreviated EEBS and a concentration node, e.g. a HN gateway, via which an EEBS may be connected to the core network will be termed "concentration gateway" and abbreviated CG. Hence, the abbreviated terms EEBS and CG encompass nodes which implement 3G WCDMA/HSPA and/or EPS/LTE (and possibly also other radio access technologies and cellular network technologies). In cases where the description needs to distinguish between EEBSs and CGs using different radio access and cellular network technologies (e.g. because there are differences in the realization of the inventive solutions for the different radio access and cellular network technologies) the terms EPS-EEBS and EPS-CG will be used to denote an EEBS and a CG which implement EPS/LTE technologies, while the terms 3G-EEBS and 3G-CG will be used to denote an EEBS and a CG which implement 3G WCDMA/HSPA technologies.

Figure 1B:
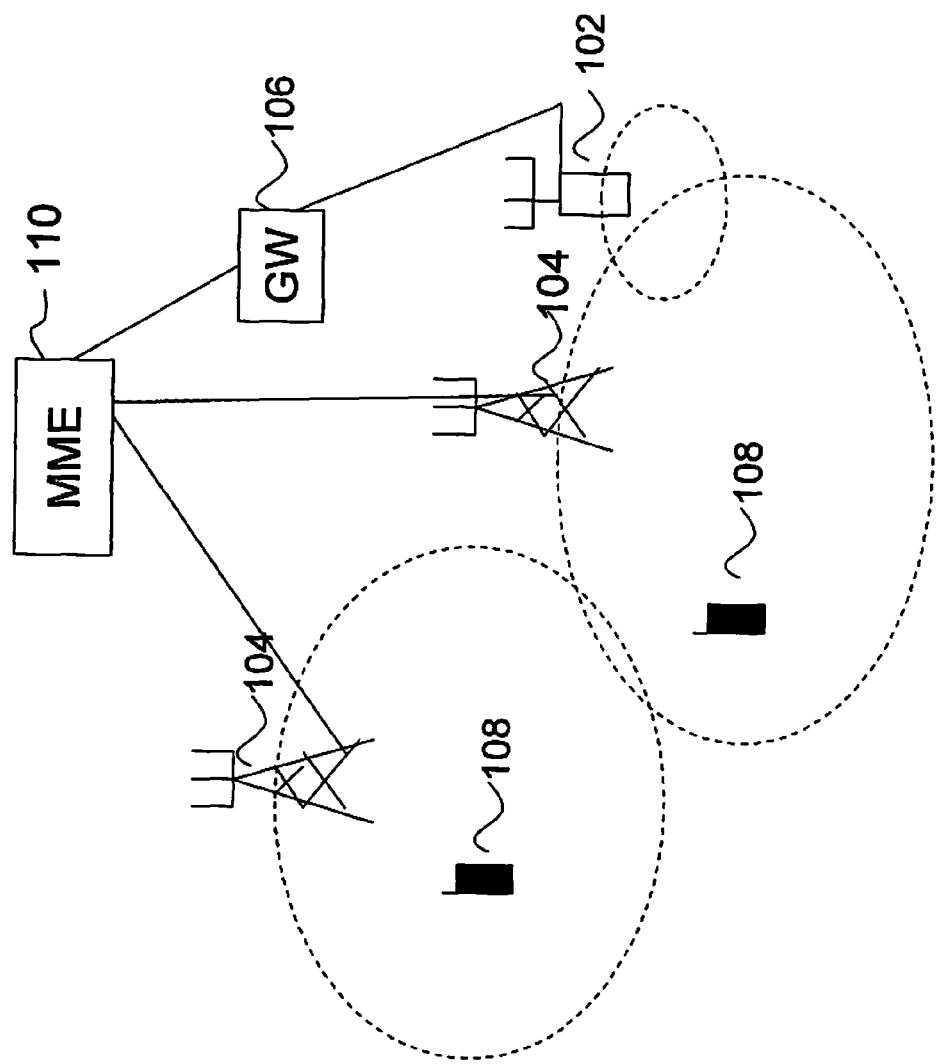

The embodiments of the present invention may be implemented in a cellular telecommunication network as illustrated in FIGS. 1a and 1b. In FIG. 1a the macro base stations 104 provide cell coverage for UEs 108. In addition, an energy efficient base station 102, exemplified by a home base station, which only a limited group of users is allowed to access is provided. The energy efficient base station 102 is serving a UE 108x and is connected to the macro base stations via a gateway 106 and the MME 110.

The embodiments of the present invention are further described in the context of an LTE system unless anything else is indicated. However, as explained below the invention may also be used in other cellular systems such as 3G/UMTS.

The basic idea of the present invention is to let the EEBS enter a low-power, low-radiation cycle, the so called "sleep mode", when there are no UEs using it, as illustrated in FIG. 1b, and to introduce methods to "wake up" the EEBS from this state when there is a UE in the vicinity which is allowed to access the EEBS and which may need it on short notice.

Figure 2:
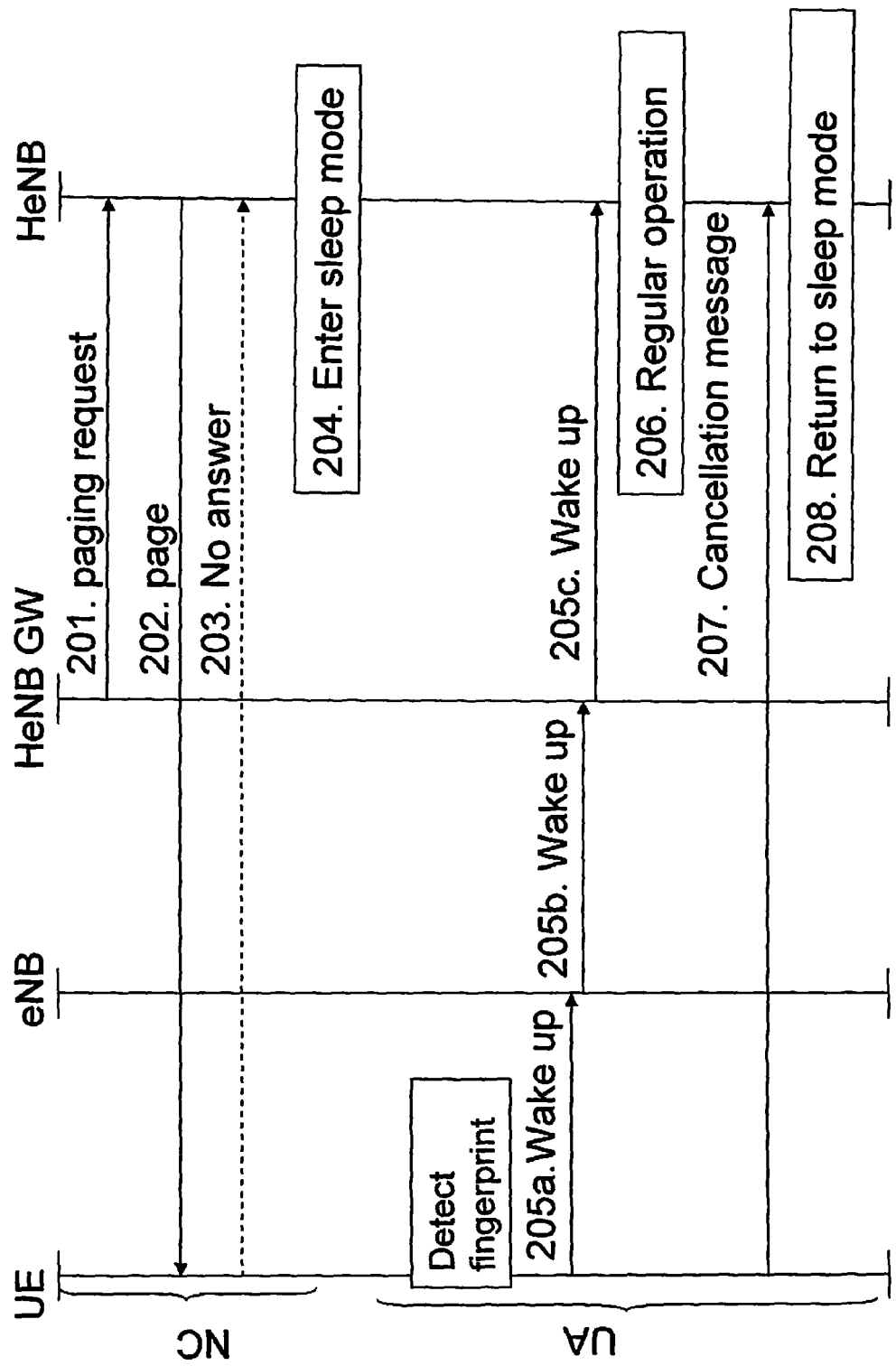
FIG. 2 is a sequence diagram of a method according to one embodiment of the present invention.

In order to exemplify an embodiment, referred to as network controlled NC embodiment, the following example is provided in conjunction with FIG. 2 which is a sequence diagram. It should be noted that this example is in the context of a home base station and an LTE network but as stated below, the invention is not limited to such a scenario. In step 201, a HeNB gateway connected to a HeNB sends a request to the HeNB to page UEs. The HeNB pages 202 UEs in its coverage area. In step 203, the HeNB detects that no answer on the page is received and decides to enter 204 the sleep mode.

According to a further embodiment, a UE assisted UA embodiment is provided which is illustrated further down in FIG. 2, denoted UA. A UE detects a fingerprint of the HeNB and sends 205a,b,c a wake up command to the HeNB via its macro eNB. When receiving the wake up command, the HeNB resumes 206 regular operation. When the UE is about to leave the coverage area of the HeNB (i.e. left the area matching the fingerprint of the HeNB), it sends 207 a wake up cancellation message to the HeNB and the HeNB returns 208 to sleep mode.

Figure 3:
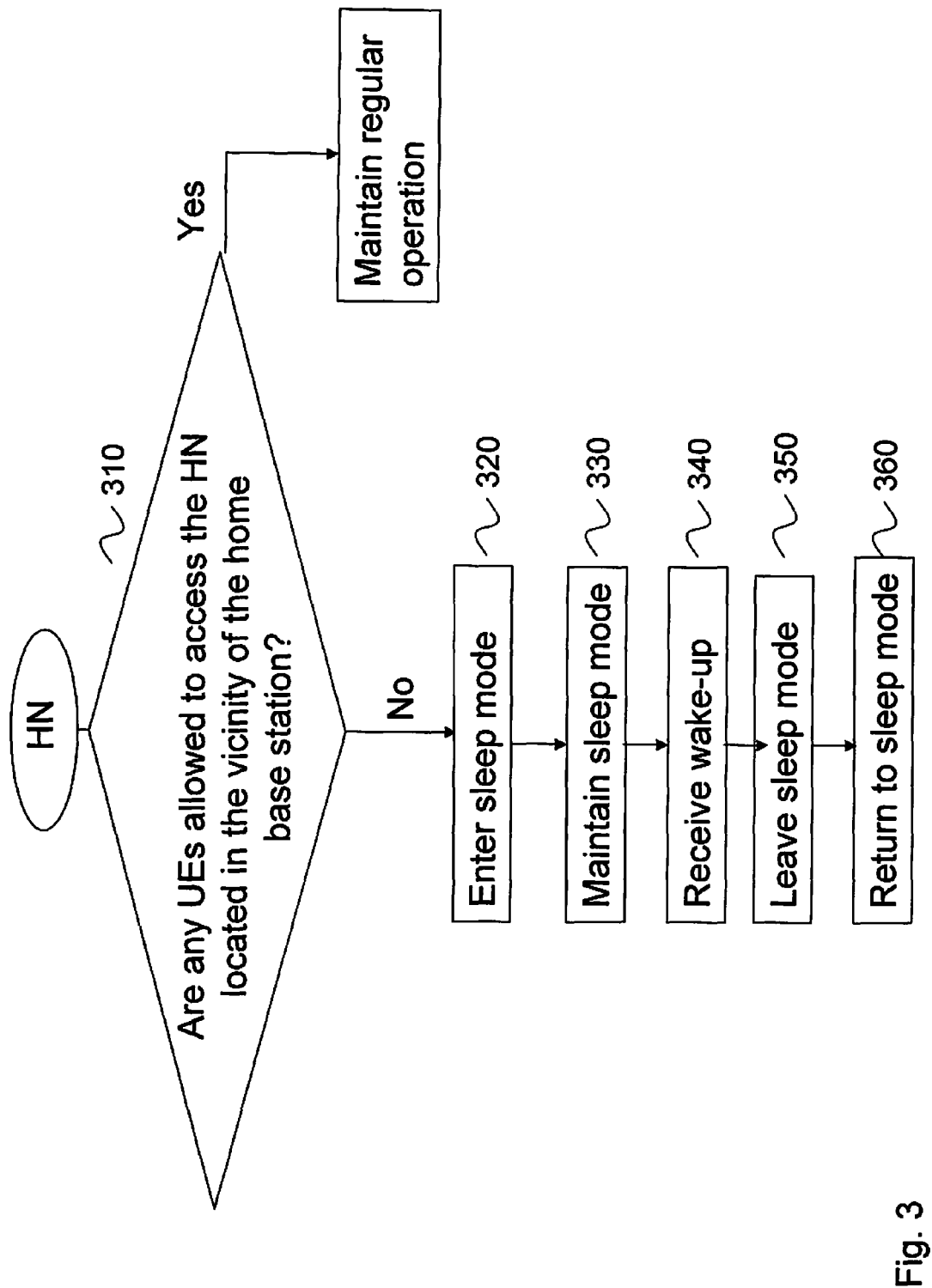
FIGS. 3 and 4 are flowcharts of the method of the base station according to embodiments of the present invention.

That implies, as illustrated in FIG. 3, that the EEBS detects 310 if no UEs that are allowed to access the EEBS are located in the vicinity of the EEBS. If no UEs are detected, the EEBS enters 320 a sleep mode, wherein the EEBS transmits its reference signal and system information less frequently than during regular operation. The sleep mode is maintained 330 until an indication is received that the EEBS should wake up from the sleep mode and return to regular operation.

The UEs that are allowed to access the EEBS do not only include the UEs which have explicitly been allowed access to the base station (i.e. UEs whose users belong to the associated CSG) but also UEs that are allowed to camp on a cell in "limited service mode", even if the UE is not allowed to "normally" access the base station. Such a UE may anyway initiate an emergency session via the base station. This should always be possible whenever there is radio access—regardless of operator and privileges. To enable such emergency sessions a UE will camp in "limited service mode" (e.g. "only emergency sessions") on a non-allowed CSG cell, if there is no better alternative. In addition, although a "closed" mode cells are described in this specification, there is also a "hybrid" mode being standardized, wherein some users (those who belong to the associated CSG) are prioritized, but provided that there are superfluous resources, any user is allowed to access the cell.

As stated above, during the sleep mode introduced by the present invention, the EEBS transmits its reference signal and system information less frequently than during regular operation. In an EPS/LTE system the reference signal is reference symbols and in a 3G/UMTS system the reference signal consists of known data, using reserved codes, on the Common Pilot Channel (CPICH).

Regular operation implies that the base station sends the reference signal frequently, so that a UE can detect it easily and fast. In EPS/LTE systems, where the orthogonal frequency division multiplex (OFDM) radio technology allows division of resources (e.g. scheduling) in both the time and frequency dimension, the reference symbols are distributed rather densely in the time-frequency grid, such that there are four reference symbols in each resource block (where a resource block consists of seven OFDM symbols on each of twelve subcarriers, i.e. all in all 7×12=84 OFDM symbols). In 3G/UMTS/WCDMA systems the reference data is continuously (i.e. without significant gap between the pieces of reference data) transmitted on the Common Pilot Channel (CPICH), where the CPICH is defined by a dedicated code (out of the orthogonal codes used in the WCDMA downlink). In addition, regular operation implies that the base station regularly transmits messages containing system information with a compound message periodicity typically in the order of tens of milliseconds.

Hence, when there are no UEs using the EEBS, in this case exemplified by the HN, and none of the allowed UEs, i.e. the UEs of the subscribers who are allowed to access the HN, has been indicated to be in the vicinity of the HN, the HN starts saving power and reducing its generated interference by reducing its radio transmissions. The HN starts to transmit reference symbols and system information (SI) and anything else that is regularly broadcast from an unused HN less frequently than during regular operation. One approach is to simply turn the radio transmitter and receiver on and off with a duty cycle allowing them to be turned off, say 90% of the time. Along with these savings on the transceiver, the HN may also put other parts of its hardware into a low-power or even in a complete shut-down mode, wherein both these two modes are referred to as the sleep mode.

Hence, the "sleep mode" could be on different levels. For example, only the radio parts of a HN could be sleeping meaning that no CSG/femtocell is active and detectable by the UEs. In another variant, the backhaul connection e.g. connection between the HN and the HN Gateway is also sleeping. This means that different solutions are needed for the different levels of "sleep mode". For example, if both the radio and backhaul parts are sleeping, then the "wake-up" method needs to be triggered by the HN itself. On the other hand, if the backhaul is not sleeping, then e.g. core network (CN) or HN Gateway based logic could be used to check whether the HN should leave the "sleep mode".

The determination to enter the sleep mode and to resume to regular operation may be performed by UE assistance or by network control according to different embodiments.

Figure 4:
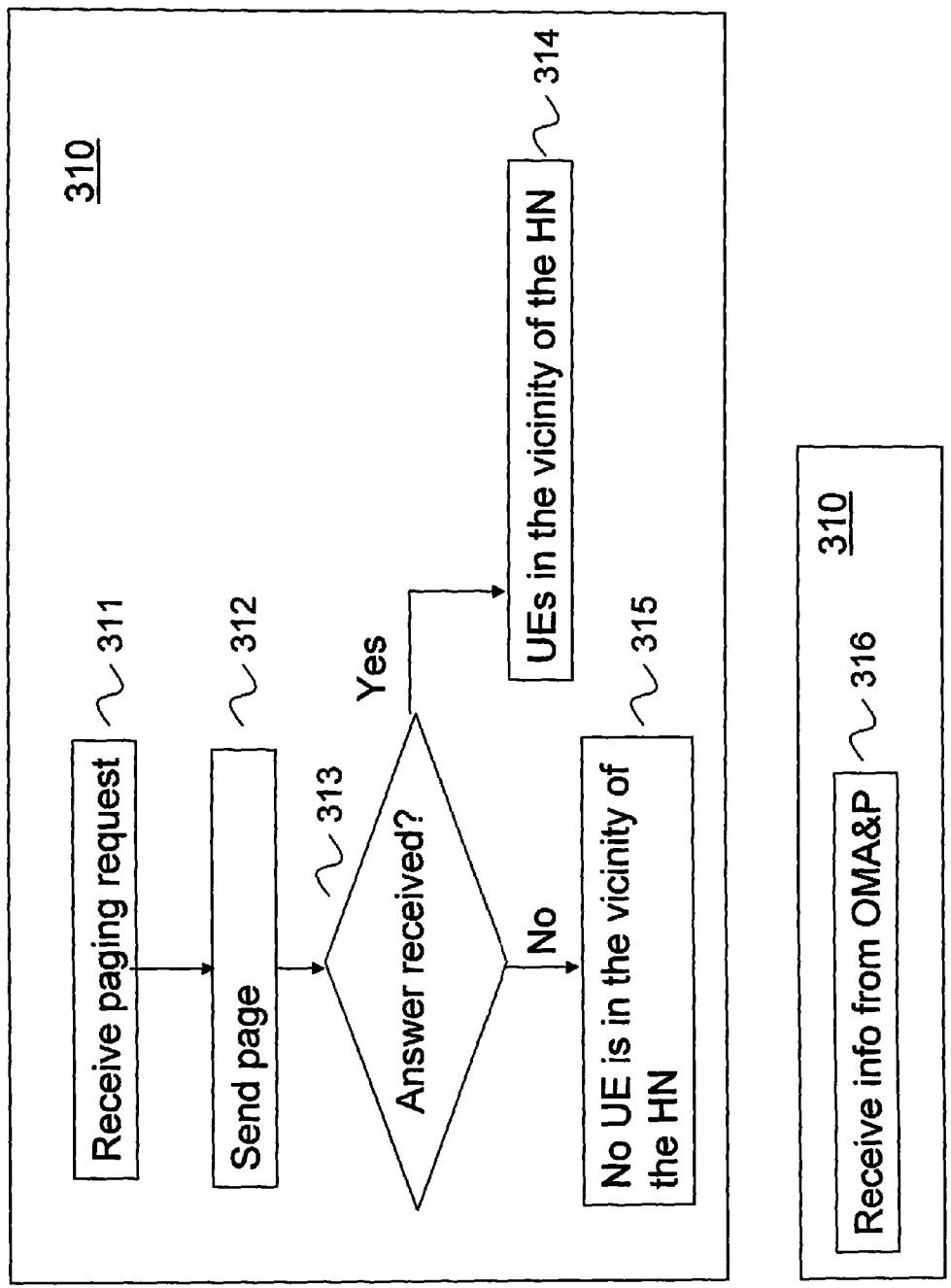

The base station determines to enter the sleep mode if it detects that no UEs that are allowed to access the base station are located in the vicinity of the base station. The base station may detect that as illustrated in FIGS. 3 and 4, by receiving 311 a trigger to initiate paging, paging 312 the UEs and determine 313 that no UEs are 315 detected in vicinity of the base station if no answer is received from UEs allowed to access the base station. If an answer to the page is received it can be concluded that there exist UEs 314 in the vicinity of the base station, but it has to be determined whether these UEs are allowed to access the base station. The UEs being paged may be all UEs in the area covered by the base station or only the UEs that are allowed to access the base station. The trigger to initiate paging may be received periodically. Further it may be a detection of no UE activity at the HN or a trigger (in the form of a request) received from a home base station gateway. In addition, lack of UE activity at the HN may in itself be a trigger for the HN to enter sleep mode, even without using paging to verify that no (allowed) UEs are present.

The indication that the home base station should wake up from the sleep mode and return to regular operation may be an attach request, service request location update, tracking area update, routing area update or paging response. The indication may also be an explicit indication (e.g. a message or a parameter in a message) from a UE to/via a network node, indicating that the UE is in the vicinity of a certain HN which the UE is allowed to access and which HN therefore preferably should be woken up (in case it is currently in sleep mode). Further, the indication may be received from the network triggered by the UE, the HN gateway, or a timer associated with the HN.

The base station may receive 340 a wake-up command from a UE allowed to access the HN via the mobile telecommunication network, and leave 350 the sleep mode to resume the regular operation, return 360 to sleep mode after a predetermined time of inactivity, wherein the predetermined time is synchronized with the UE which has sent the wake-up command. The base station may also return 360 to sleep mode upon reception of an explicit instruction from the UE which has sent the wake-up command.

Figure 5:
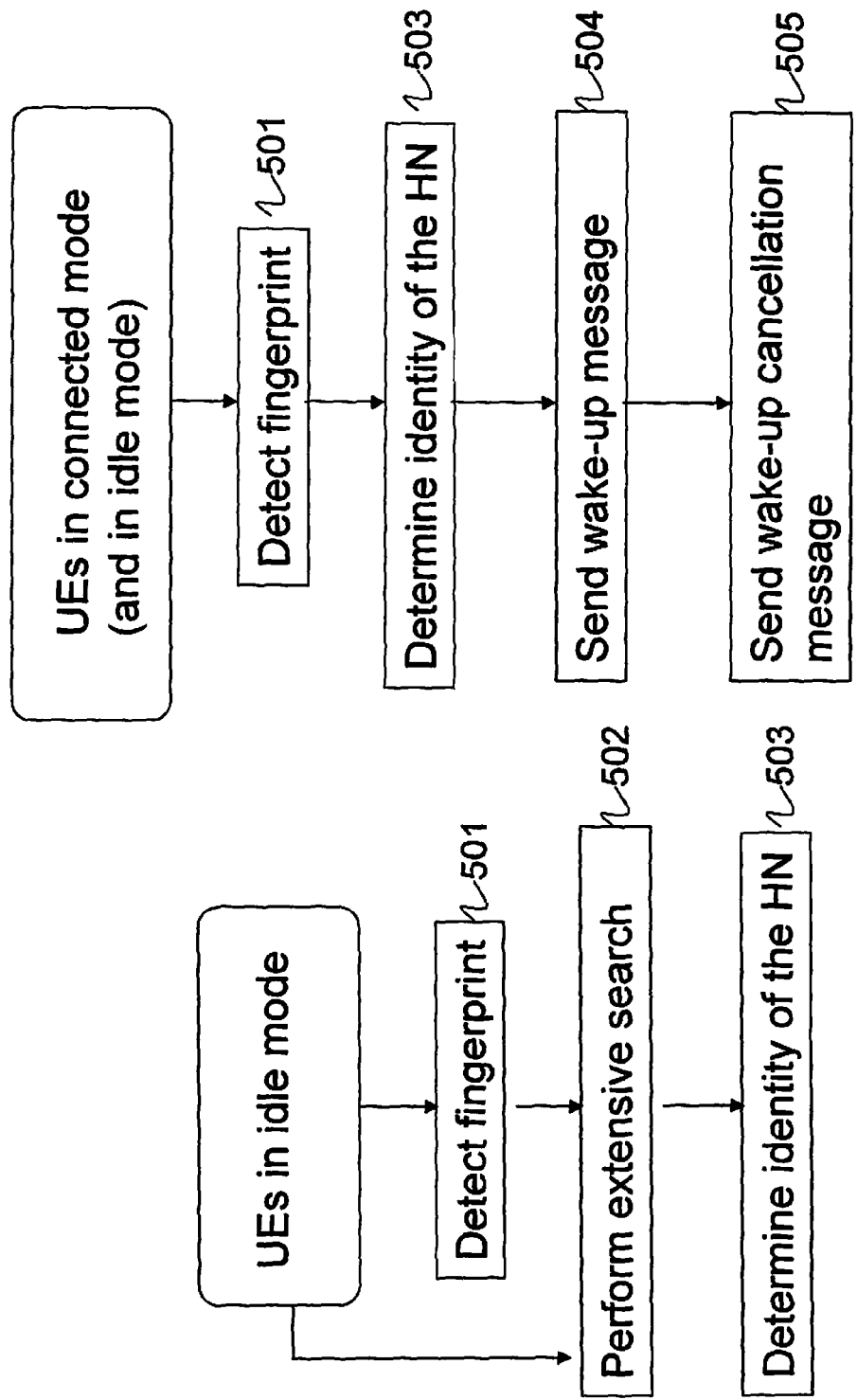
FIG. 5 is a flowchart of the method of the UE according to embodiments of the present invention.

Turning now to FIG. 5 showing the UE assisted solution according to one embodiment, where the UEs in idle mode or connected mode can detect 501 a fingerprint of base stations indicating that the UEs are in the vicinity of an HN that the UEs are allowed to access. This triggers a UE in idle mode to perform an extensive search 502 for the HN associated with the detected fingerprint, by pro-longing the search or using more frequent search periods than during regular operation. However, UEs in idle mode can as an alternative perform 502 an extensive search for HNs that the UEs are allowed to access, even without a prior detection of a fingerprint associated with one of the allowed HNs. In such a case the extensive search may be initiated periodically or after a manual trigger by the user. The purpose of extending the search is to facilitate discovery of an HN that is in sleep mode. Then the UEs determine 503 an identity of the HN which is associated with the detected fingerprint or which was detected through extensive search. A UE in connected mode then sends 504 an indication to the mobile telecommunication network that it should wake up the HN using the determined identity, and sends 505 a wake-up cancellation message to the HN via the mobile telecommunication network, when the UE is no longer located in the vicinity of the HN. A UE in idle mode may also send 504 an indication to the mobile telecommunication network that it should wake up the HN using the determined identity, and send 505 a wake-up cancellation message to the HN via the mobile telecommunication network, when the UE is no longer located in the vicinity of the HN. However, these actions are not performed by a UE in idle mode, which detected the HN through extensive search.

As explained below, the search may be initiated upon detection of a fingerprint of macro base stations indicating that the UE is in vicinity of the at least one HN which it is allowed access. In addition, the search may be initiated periodically or manually by the user of the UE.

Thus, to facilitate discovery of a HN in low-power mode according to the UE assisted solution, a UE in idle mode which has the right to access the HN may use more extensive searches e.g. prolonged or more frequent search periods. The UE could do this when the fingerprint of an allowed CSG cell of the HN is detected or, optionally (e.g. when no reliable fingerprint is available in the UE), periodically (e.g. initiated every five minutes). In addition, the user of the UE could manually trigger extensive search for an allowed CSG cell.

The above described idle mode behavior may be appropriate for idle UEs, for which discovery of an allowed CSG cell is not time critical. For UEs in connected mode the situation is however different. For performance and/or charging reasons it may be desirable to enable swift CSG cell discovery for connected-mode UEs. Hence, when a UE in connected mode (connected to a macrocell) recognizes the "fingerprint" of an allowed HN/CSG cell, it informs the network about the HN to be woken up using one or more suitable identities (which the UE may have learnt when connected to the CSG cell). In EPS these identities are preferably the eNB ID of the HeNB and the TAI of the CSG cell. In 3G these identities are preferably the RAI of the CSG cell, the identity of the HNB and the RNC-ID (Radio Network Controller identity) of the HNB GW to which the HNB is connected. An alternative would be to enable the network to identify the HN based on the global cell identity which is the UTRAN cell identifier in 3G and the E-CGI in EPS, in which case it would suffice to inform the network of the global cell identity of the CSG cell whose serving HN is to be woken up. Providing the global cell identity in addition to the above preferred identities could also be useful in case the concerned HN has several cells, in which case the global cell identity would indicate precisely which of the HN's cells that is affected. The UE may use RRC (Radio Resource Control) signaling to the RNC in 3G or the eNB in EPS or NAS (Non Access Stratum) signaling to the SGSN/ MSC (Serving GPRS Support Node/Mobile Switching Center) server in 3G or the MME (Mobility Management Entity) in EPS to inform the network. The UE may convey the information to the network as a part of an existing NAS or RRC message or as a new dedicated "wake-up message". Identities provided by the UE contain information which allows the receiving network node to locate the HN that serves the concerned CSG cell and the HN Gateway of this HN. The TAI/ RAI (Tracking Area Identity/Routing Area Identity) allows the MME/SGSN to locate the MME/SGSN (pool) serving the HN which typically is the pool of the MME/SGSN itself. The eNB ID of the HeNB lets an MME in the serving MME pool identify the HeNB and the HeNB GW to which the HeNB is connected (if any) and the ID of the HNB in combination with the RNC-ID of the HNB GW let an SGSN in the serving SGSN pool identify the HNB. If an X2 interface is available between the (H)eNB receiving the message from the UE and the concerned HeNB, possibly via a HeNB Gateway, then the (H)eNB receiving the message from the UE can use the eNB ID of the concerned HeNB (or the global cell identity of a cell of the concerned HeNB), if provided by the UE) to identify the concerned HeNB.

The network node then sends a "wake-up message" to the HN, instructing it to resume regular operation. If the UE provided the global cell identity of the concerned CSG cell, the network node can convey this to the HN, so that the HN, if it serves more than one cell, can selectively resume regular operation in only the indicated cell. If the sending node is an SGSN, the message may first be sent to another SGSN in another SGSN pool if the SGSN pool concept is used and then via the HNB Gateway to the HNB. If the sending node is an RNC the message is first sent to the SGSN serving the RNC before traversing the above described path. If the sending node is an MME, the message may first be sent to another MME in another MME pool and then via the HeNB Gateway to the HeNB. If the sending node is an eNB the message is first sent to the MME serving the eNB before traversing the above described path. Alternatively the wake-up message may be sent to the HN Gateway which in turn informs the HN. If an X2 interface is available between the (H)eNB receiving the message from the UE and the concerned HeNB, possibly via a HeNB Gateway, then the (H)eNB receiving the message from the UE may forward the wake-up indication directly to the concerned HeNB via the X2 interface.

On reception of the message the FIN resumes regular operation and returns an acknowledgement message which is passed all the way back to the UE. The UE can then use regular search/discovery methods to discover the CSG cell, so that a handover to it can be initiated.

If the HN is not connected to the HN Gateway, e.g. because the HN is turned off, or if the HN is unavailable for other reasons, the HN Gateway will return a negative acknowledgement on behalf of the HN. The UE can then refrain from searching for the CSG cell for a while (e.g. a specified time such as 300 seconds) and then try the wake-up procedure again.

After being woken up a HN should not continue with regular operation indefinitely, if it is not accessed by an allowed UE. When to return to low-power mode/sleep mode again can be controlled in two different ways.

According to one alternative, the HN waits a certain predefined e.g. configured time period before returning to low-power mode unless accessed by an allowed UE in which case the HN of course continues with regular operation. The UE should preferably also be aware of this time period, so that it knows when a new wake-up message is needed. This is referred to as synchronous low-power entrance control.

According to another alternative, referred to as asynchronous low-power entrance control, the HN remains in regular operation mode until explicitly informed that the UE that woke it up is no longer in the vicinity. Hence, a UE that has sent a wake-up message and received a positive acknowledgement should send a cancellation message in the same manner as the wake-up message was sent when it can no longer detect the fingerprint that triggered the wake-up message (nor the HN itself). On reception of the cancellation message the HN returns to the low-power mode. If the HN receives several consecutive wake-up messages, it should keep track of the number of these messages and possibly of the UEs sending them and should not return to low-power mode before it has received cancellation messages from all the UEs that have sent wake-up messages. The HN cannot completely rely on cancellation messages since the UE which woke it up may not be able to send a cancellation message, e.g. because it is out of coverage, and should therefore use a time-based control as a fallback method. Hence, even if the HN does not receive any cancellation message it should eventually return to low-power mode after a certain time period. This time period should preferably be significantly longer than a time period that is suitable for synchronous control, e.g. 30 minutes. This time period should preferably be known by the UE(s), so that it(they) can adapt its(their) behavior accordingly.

When the last UE connected to a HN leaves the HN, the HN should use synchronous low-power entrance control to govern when it enters low-power mode. If the UE left the HN through a handover, the HN may alternatively use asynchronous low-power entrance control which requires that the handed over UE knows that it should send a cancellation message when it leaves the fingerprint area.

When a HN is not connected to its HN Gateway (e.g. because the HN is turned off) and the HN Gateway receives a wake-up message destined for the unconnected HN, the HN Gateway may store this wake-up message or an indication of its reception for a certain time in addition to returning a negative acknowledgement. When the HN is later reconnected to the HN Gateway, the HN Gateway checks if it has a wake-up message, or an indication of such a message, stored for the HN. If so, the HN Gateway may instruct the HN to refrain from entering low-power mode for some time. The HN's regular behavior should preferably be to use regular operation some time after reconnection to the HN Gateway and certainly so after having been turned on, but even so, the instruction from the HN Gateway may trigger the HN to remain in regular operation mode for a longer time than it should otherwise have done.

In this situation the HN Gateway may also attempt to inform the UE that had sent the wake-up message and possibly other UE's that are allowed to access the HN too that the HN has now reconnected to the HN Gateway (or has become available again) and should be accessible using regular operation. To notify the UE that sent the wake-up message an EPS HeNB Gateway could send a message to the MME which served the UE when the wake-up message was sent. If this MME still serves the UE it can forward the information to the UE via the eNB either using NAS signaling to the UE or S1AP (S1 Application Protocol) signaling to the eNB and RRC signaling from the eNB to the UE. To enable this, the wake-up message should include an identity of the UE (i.e. the GUTI (Globally Unique Temporary Identity), S-TMSI (S-Temporary Mobile Subscriber Identity) or IMSI) and the GUMMEI (Globally Unique MME Identity) of the serving MME (inserted into the wake-up message by the UE, the eNB or the MME) and these identities should be stored in the HeNB Gateway and should be included in the notification message sent by the HeNB Gateway. Note that the GUMMEI of the serving MME is a part of the GUTI, so if the GUTI is provided, the GUMMEI does not have to be conveyed separately. If the previous serving MME no longer serves the UE, the notification will fail. In 3G, the wake-up message and the notification from the HNB Gateway should include a corresponding 3G identifier which uniquely identifies the serving SGSN/MSC server and the SGSN/MSC server can forward the information to the UE in a similar way via the RNC. If an X2 interface is established between the (H)eNB that received the wake-up message from the UE and the concerned HeNB via the HeNB GW, then the HeNB GW may attempt to notify the UE by sending a message to the (H)eNB that received the wake-up message from the UE (and which forwarded this wake-up message over the X2 interface where it was intercepted by the HeNB GW), so that this (H)eNB can forward a notification to the UE.

In addition to informing the UE that sent the wake-up message, the HN Gateway may optionally also inform other UEs which are allowed to access the HN that the HN has reconnected to the HN Gateway and this may be done even if the HN Gateway has not stored any wake-up message or indication of a wake-up message. To do this, the HN Gateway may inform the Operation, Maintenance, Administration and Provisioning (OMA&P) system, which may identify the affected UEs i.e., the UEs of subscribers which are included in the CSG associated with the HN, and the OMA&P system may then inform the affected UEs, using similar mechanisms as when CSG Whitelists are conveyed to UEs e.g. OMA DM, NAS signaling triggered by informing the MMEs or by informing the HSS which in turn contacts the MMEs, Over-The-Air mechanisms or SMS e.g. secure SMS.

A further variant which requires standardization would be that the RRC protocol introduces a CSG keep alive mechanism; this could be restricted to CSG cells only i.e. UEs camping on a CSG cell should within a configurable time perform a keep alive action. This could simply be a RRC connection request with a special cause that is treated in a special way, e.g. just acknowledged by the HN. If the HN has not received this keep alive indication for a certain period from any UEs (nor detected any other UE activity), it can safely enter a sleep mode. Similar behavior, albeit with the disadvantage of creating some additional load on the core network nodes, could be achieved using a periodic location, routing area or tracking area update. Hence, the step of detecting UEs in the vicinity of the base station may comprise detecting lack of UE activity in a cell of the HN, wherein the lack of activity includes absence of reception of keep-alive messages, attach request, service request, routing area update, location update, or tracking area update. Accordingly, the UE may at regular intervals send keep alive messages to a HN which the UE is allowed to access when camping on the HN to prevent the HN from entering the sleep mode.

An option which improves the performance of the solution for idle UEs is to let idle UEs send wake-up messages. Note that since a UE has to be at least temporarily in connected mode in order to send the wake-up message, it is not strictly correct to say that the idle UE sends a wake-up message, but the intention is to capture the fact that the UE does not have a user plane connection and enters connected mode only for signaling purposes, potentially even exclusively for sending a wake-up message.

The UE can leverage an occasion when it anyway enters connected mode in order to signal to the network, e.g. during network Attach or updating of the registration area (i.e. LA, RA or TA), and send the wake-up message when this opportunity appears (provided that the fingerprint of an allowed CSG cell served by the HN is detected). Optionally the UE may also contact the network and enter connected mode exclusively for the purpose of sending a wake-up message.

Either synchronous low-power entrance control or asynchronous low-power entrance control can be used also in combination with wake-up messages from "idle" UEs.

Now the network controlled methods will be described by the following examples. First, different sleep mode determination methods are considered.

In the network controlled methods, the HN considers the presence of both connected and idle UEs which are allowed to access the CSG cell in the CSG cell in the sleep mode determination process.

The first part is to determine when the HN should enter sleep mode i.e. how the network could know that there are no idle UEs camping on the HN. It is obvious that while there are UEs active on the HN, no sleep mode should be entered.

The HN or the HN Gateway may know the UEs that are allowed to access and use the HN. This information may for example be explicitly obtained 316 from the OMA&P (Operation, Maintenance, Administration and Provisioning) system administrating the CSGs and HNs.

Figure 6:
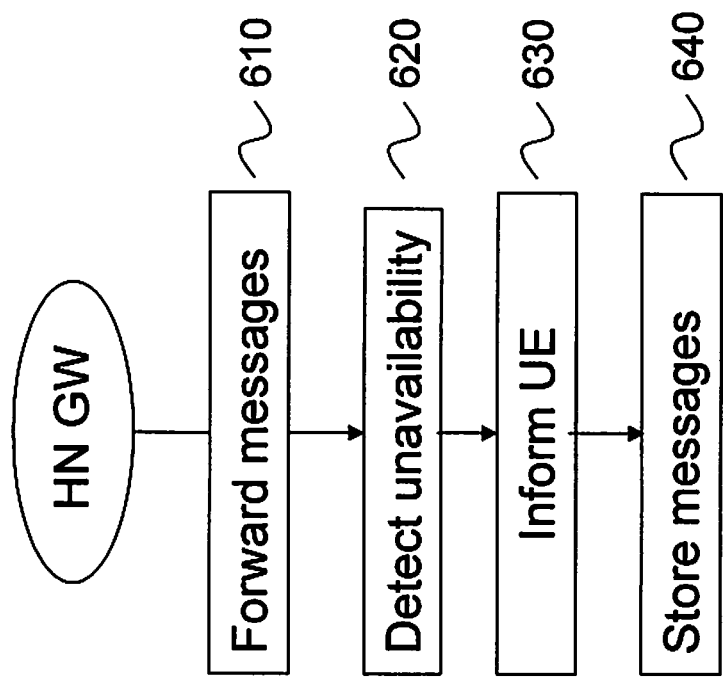
FIG. 6 is a flowchart of the method of the base station gateway according to embodiments of the present invention.

As illustrated in FIG. 6, since the HN gateway connects the HNs to the mobile network, the HN gateway can forward messages 610 between the HN and the core network nodes of the mobile telecommunication network and even further via the core network to macro base stations and UEs connected to macro base stations. According to embodiments of the present invention, the HN gateway can also detect 620 disconnection of a HN (or if the HN is unavailable for other reasons, e.g. due to O&M operations or software upgrades) and can accordingly inform 630 the UE of the detected disconnection (or unavailability due to another reason). If a HN is disconnected (or unavailable for other reasons) messages sent to that HN may be stored 640 in the HN gateway for future forwarding when the HN reconnects to the HN Gateway (or when the HN becomes available again).

According to one embodiment of the network controlled methods, referred to as the HN based method, the HN knows the IMSIs of the allowed UEs (e.g. through the means described above) and controls the sleep mode determination. The determination of sleep mode can be handled without standardization changes to the protocols. The HN could then initiate a normal paging for the UE's by either using IMSI or S-TMSI/TMSI, depending on which identities are known of the UEs that are allowed to use the HN, if no UE activity has been detected for a certain time period. If no UE answers the page, the HN can enter sleep mode. If a UE as a result of the page establishes a RRC connection to the HN and answers the page, the RRC connection is released, and the HN enters a waiting period i.e., maintains regular operation (not in sleep mode), before paging again.

In order to page a UE in DRX (Discontinuous Reception) mode in LTE, the HeNB has to be able to calculate the radio frame and paging occasion within the frame at which the UE will listen for paging messages addressed to it. In order to do that the HeNB has to know the UE's IMSI which it in this case does as mentioned above, or at least a certain part of the IMSI and some information that is included in the System Information (SI), e.g. a DRX parameter. Since the HeNB broadcasts the SI, it knows these parameters too. However, there is a possibility to allocate a UE specific DRX parameter which overrides one of the parameters in the SI. This overriding parameter, if used, is normally transferred to the HeNB (or eNB) from the MME in the S1AP PAGING message, but in this context there is no S1AP PAGING message to rely on.

Although the consequences for the DRX paging algorithm (i.e. calculating frame and paging occasion) are presently somewhat unclear, it is probable that the only possible consequence of an overriding DRX parameter is that the frequency of the occasions at which the UE listens for paging messages increases. This means that if the HeNB does not know, and consequently does not consider, such an overriding parameter allocated to a UE the relevant occasions calculated by the HeNB will match a subset, e.g. every second or every fourth, of the corresponding occasions calculated (and used) by the UE. Hence, the consequence is only that the paging will take somewhat longer time than it otherwise would, which is a minor problem.

If it eventually turns out that the DRX paging algorithm is affected by an overriding DRX parameter in more ways than a change of frequency, e.g. a change of offset, this is likely to be a minor problem anyway. The reason is that it is not unlikely that the possibility to override this parameter is removed from the standard and if it is not removed it is at least likely that it will not be used.

Yet an alternative, which may be most suitable when the number of allowed UEs is small, is that the HN pages each allowed UE, one after the other in all the paging occasions during one or a few cycles.

According to a further embodiment, referred to as the HN gateway based method, the HN Gateway knows the IMSIs of the allowed UEs e.g. through the means described above and controls the sleep mode determination. A standardization change is needed in the protocol between the HN and the HN Gateway to introduce an optional message that can be sent from a HN Gateway to a HN to command the HN to enter sleep mode as described below.

The HN Gateway could initiate normal paging for the UEs that are allowed to use the HN if no activity has been detected for a certain time period. If no UE answers the page, the HN Gateway can order the HN to enter the sleep mode with a new message. If a UE as a result of the page establishes a RRC connection to the HN and answers the page which leads to that a connection is set up to the HN Gateway, the connection established between HN and HN Gateway due to the paging response is released by the HN Gateway. The RRC connection is then as a result subsequently released, and HN Gateway enters a waiting period before ordering paging again.

Furthermore, the standards could be modified in the following way. The RRC protocol may be modified such that a new paging type is introduced, a "CSG paging" method. In this case the HN initiates the CSG paging when no activity has been detected for a certain time period. Then the UEs allowed to access the HN should respond, and if no UEs respond the FIN can enter sleep mode.

The CSG page can be triggered either from the HN or from the HN Gateway. If it is triggered from the HN Gateway, then new indication for the paging type may be needed in the signaling between HN Gateway and HN to indicate CSG paging.

Additionally, the CSG Page message sent from the HN towards the UE can be built in two different ways. The message can either contain an indicator for "CSG paging" meaning that all UEs, that have the CSG-ID of the current cell in the list of allowed CSG cells, i.e. the CSG whitelist, should respond to the CSG page. Another similar possibility is to include the CSG-ID in the CSG Page message.

Finally, there can also be UEs camping on a CSG cell that have limited access to the CSG cell. These UEs could be camping in a limited service state, e.g. for the purpose of enabling emergency calls, in the case the CSG cell is the only coverage detected by the UE. These UEs should also respond to the CSG Page message.

An alternative to CSG paging is to introduce a universal P-RNTI (paging group identity), which all UEs react on when received (i.e., in essence a universal paging). The UE-Identity in the PagingRecord parameter in the paging message could then be set to a universal UE identity or a CSG identity (in essence making it CSG paging) or simply be absent/void.

Once the HN entered the sleep mode as a result of any of the above described methods, there are several variants for the network to determine when to wake up the HN and to resume regular operation.

The following is a HNB based method for 3G/UMTS. In case separate LA/RA (Location Area/Routing Area) is used for the HNB layer compared to the macro layer and the HNB handles the wake up procedure, the HNB could wake up at regular intervals and start broadcasting the system information for a certain time. How frequently the HNB wakes up from low-power mode could to a certain extent be dynamically determined, i.e. if coverage from other base stations can be detected then it is not time critical for a HNB to wake up since sessions can continue without requiring the HNB. During such circumstances the time intervals the HNB spends in low-power mode can be prolonged to increase the energy saving. Any UE allowed to use this HNB would eventually discover the HNB and perform an access to perform a LA/RA update. The HNB would then maintain regular operation and regularly perform the sleep mode determination. In addition, the HNB may consider the result of the LA/RA update when deciding whether to maintain regular operation or continue in sleep mode. For example, if all the location and routing area updates triggered in this case are rejected, then the HNB may again enter sleep mode.

If the same LA/RA used for HNB and macro layer, one of the paging methods as described for sleep mode determination needs to be performed as well to find out if allowed UEs are in the coverage area of the HNB.

In order to enable an optimization that allows the UEs to predict when the HNB will wake up to transmit system information, these wake-up occasions could be derived from a parameter known to the allowed UEs using a specified algorithm. The known parameter could e.g. be the CSG ID of the cell. Transmissions in the overlaying macrocell, e.g. frame numbers, could be used as a common time reference for the HNB and the UE, thus enabling the synchronization.

A HeNB based method in an EPS is further described. This case is very similar to the above described HNB based method for 3G/UMTS but using Tracking Areas (TAs) instead of LAs/RAs. In addition, if TA lists are used and the TA list in the UE includes both the HeNB/CSG cell TA and the macro TA, one of the paging methods is also needed to discover an allowed UE in the coverage area of the HN.

The optimizing synchronization/prediction method described above for the HNB based method for 3G/UMTS could be used also for HeNBs.

The HN gateway may also handle the wake up procedure. In this case, the HN gateway can at regular intervals wake up the HN and initiate paging as described for the sleep mode determination, the page order received in the HN could be seen as an indication to wake up or a new dedicated message could be used to wake up the HN before the page message is sent. If no addressed UE responds to the paging, the HN Gateway can then send a message to order the HN to sleep again. If an addressed UE answers, the HN maintains regular operation (i.e. remains in non-sleep mode) and the HN gateway returns to performing sleep mode determination again.

Another variant applicable for LTE where the concept of TA (Tracking Area) lists exists is enabled if the Core Network (CN), e.g. the MME, is aware of the fingerprint of the location of the UE's allowed HN/CSG cell (at least to a certain extent, e.g. the overlaying macro layer TA or overlaying macrocell covering the location of the HN/CSG cell). The MME can then, when adding the TA for the HeNB to the UE's TA list, also inform the HeNB with a new S1AP message that an allowed UE is in the vicinity of the CSG cell. The HeNB can then leave the sleep mode. Similarly, the MME can inform the HeNB when the CSG cell TA is removed from the UE's TA list or when the UE detaches, the HeNB could then have algorithms to determine when to enter sleep mode, i.e. keep track of when there is no UE left that has the CSG cell TA in its TA list.

These procedures could use an acknowledgement message to ensure that the HeNB is informed about all changes.

Figure 7:
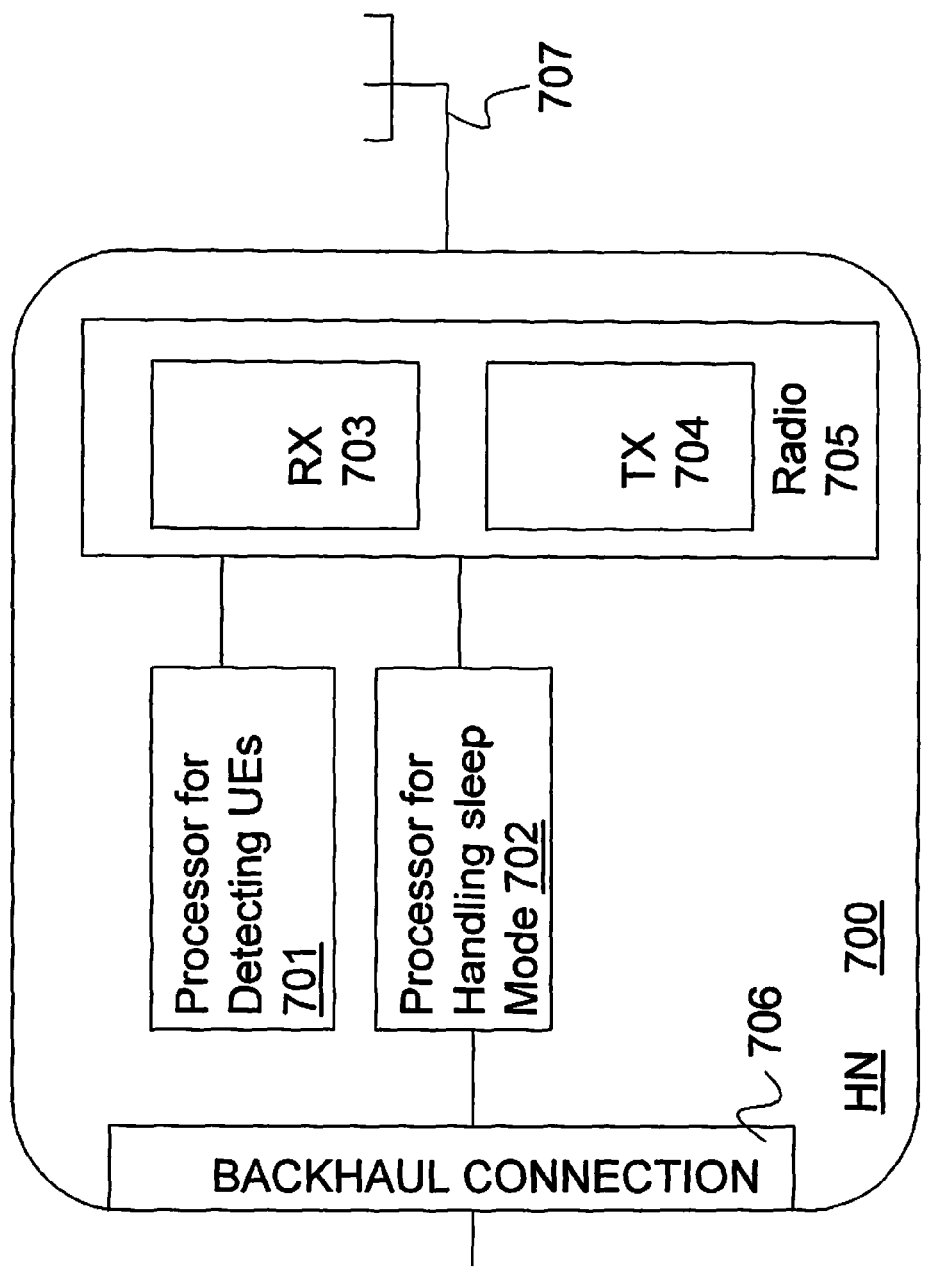
FIGS. 7-9 illustrate a base station, a gateway and a UE according to embodiments of the present invention.
Figure 8:
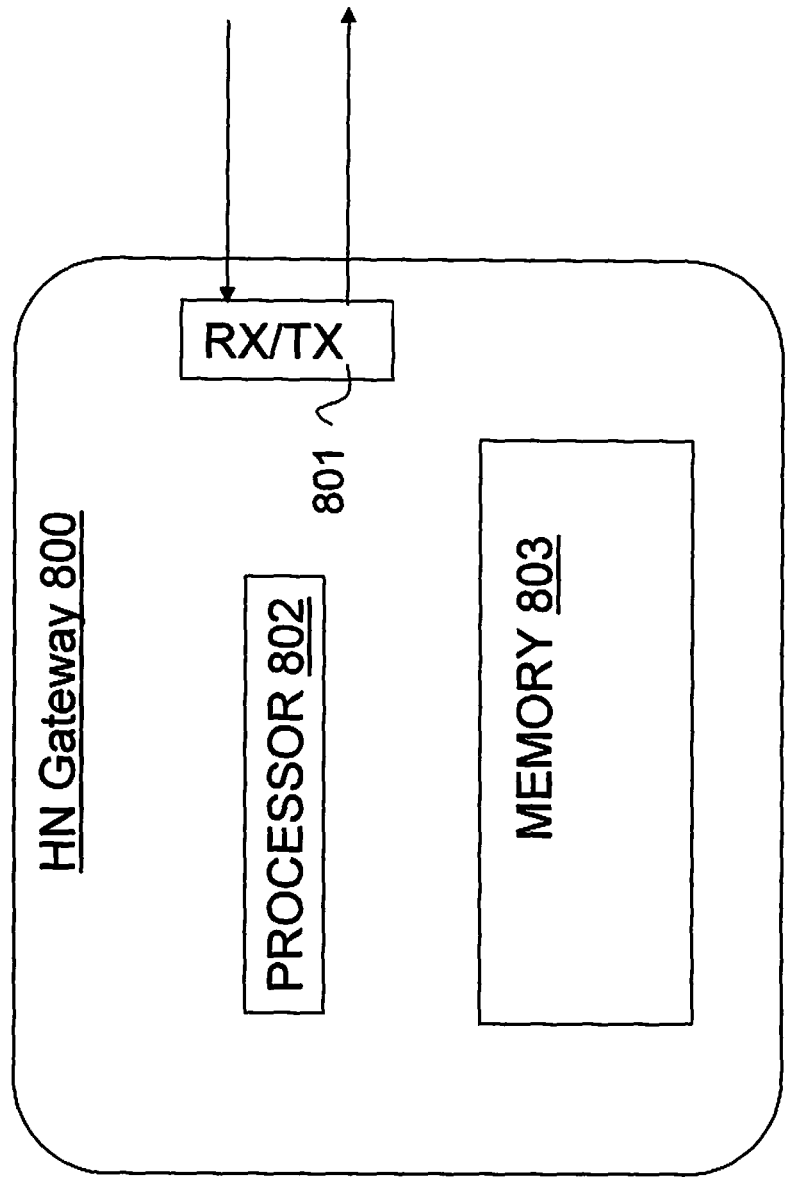
Figure 9:
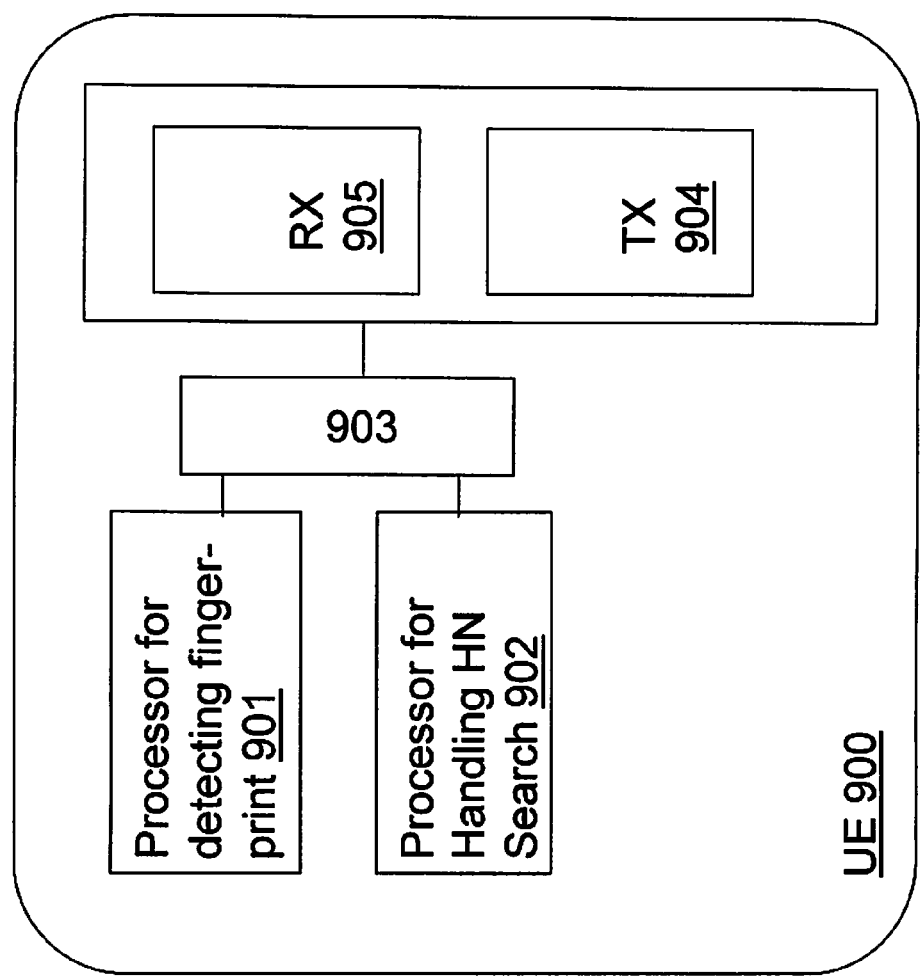

Turning now to FIGS. 7, 8 and 9, which illustrate the EEBS, the UE and the concentration gateway (CG) according to embodiments of the present invention.

An EEBS is illustrated in FIG. 7, wherein the EEBS may be a home base station or another type of base station as explained above. The EEBS 700 comprises a processor 701 for detecting if no UEs allowed to access the EEBS are located in the vicinity of the EEBS and a processor 702 for handling sleep mode configured to enter a sleep mode if no UEs are detected. In the sleep mode, the EEBS is configured to transmit its reference signal and system information less frequently than during regular operation. The processor 702 for handling sleep mode is further configured to maintain the sleep mode until an indication is received that the EEBS 700 should wake up. The processor 701 for detecting if no UEs allowed to access the base station are located in the vicinity of the base station and the processor 702 for handling sleep mode may be one and the same processor.

In a further embodiment, the base station further comprises a receiver 703 for receiving a trigger to initiate a paging for UEs, a transmitter 704 for paging the UEs, and the processor 701 for detecting is further configured to determine that no UEs are detected in vicinity of the base station if no answer is received from UEs allowed to access the base station. The processor 702 for handling sleep mode is configured to put the base station in sleep mode if no UEs allowed to access the base station are detected in the vicinity. The base station comprises further an antenna 707 connected to the radio part 705 of the base station 700 and a backhaul connection 706 to the network.

In yet a further embodiment the receiver 703 is configured for receiving a wake-up command from a network node or from a UE via the core network. The processor 701 for detecting is configured to, upon reception of a wake-up command, determine that a UE is detected in the vicinity. The processor 702 for handling sleep mode is configured to bring the base station out of sleep mode to resume regular operation when a UE is detected in the vicinity (i.e. if a wake-up command is received), unless the base station already was using regular operation when the wake-up command was received, in which case the processor 702 for handling sleep mode is configured to make the base station maintain regular operation. Moreover, the processor 702 for handling sleep mode is further configured to make the base station return to sleep mode after a predetermined time, wherein the predetermined time is synchronized with the UE which has sent the wake-up command or upon reception of an explicit instruction from the UE which has sent the wake-up command. The base station comprises further an antenna 707 connected to the radio part 705 of the base station 700 and a backhaul connection 706 to the network.

Further FIG. 8 illustrates a concentration gateway (CG), e.g. a home base station gateway (HN gateway) 800, concentrating a plurality of EEBS of a mobile telecommunication network, such as home base stations, configured to enter a sleep mode, wherein the EEBSs transmit their reference signal and system information less frequently than during regular operation. The CG gateway comprises at least one transceiver 801 for forwarding messages to the EEBS comprising wake up and wake-up cancellation commands. Usually, the CG gateway comprises one transceiver for communicating with the core network and another transceiver for communicating with the EEBSs. However a single transceiver may be used for the communication with the core network and with the EEBSs.

Moreover, according to an embodiment the CG comprises a processor 802 for detecting that an EEBS is disconnected/reconnected from the CG (or unavailable for other reasons such as O&M operations or software upgrade), and the transceiver is configured to inform a UE that the EEBS is not available/available e.g. due to disconnection/reconnection, restart, temporary error condition, O&M operation, software or hardware upgrade, etc. The CG comprises according to one embodiment a memory 803 for storing messages comprising wake-up and wake-up cancellation commands.

FIG. 9 illustrates a UE 900, which comprises a processor 902 for performing a search for HNs that the UE is allowed to access, by pro-longing the search or using more frequent search periods compared to regular operation for detecting a FIN in sleep mode that the UE is allowed to access. The UE further comprises a processor 901 for detecting a fingerprint based on transmissions from macro base stations indicating that the UE is in the vicinity of an HN or a CSG cell that the UE is allowed to access. In addition, a processor 903 for determining an identity of the detected FIN in sleep mode is provided and the UE 900 further comprises a transmitter 904 for sending an indication to the mobile telecommunication network that it should wake up the HN using the determined identity and a receiver 905 for receiving transmissions from base stations. The processor 901 for detecting a fingerprint, the processor for performing a search, and the processor 903 for determining an identity may be one and the same processor.

It should be noted that the processor 902 for performing the search may be configured to initiate the search periodically or upon detection of a fingerprint of macro base stations indicating that the UE is in vicinity of the at least one HN which it is allowed access. It may also be further configured to initiate the search upon a manual indication from the user of the UE.

In addition, the transmitter 904 may be configured to at regular intervals send keep alive messages to a HN which the UE is allowed to access when camping on a CSG cell served by the HN to prevent the HN from entering sleep mode. In order to transfer a HN back to sleep mode after having woken up the HN, the transmitter 904 may be configured to send a wake-up cancellation message to the HN via the mobile telecommunication network.

It should be noted that "vicinity" may be interpreted as "the area where the fingerprint is detected", in the UE assisted embodiment, or as "in the coverage area of any of the cells served by the HN", in the network controlled embodiment.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in an energy efficient base station (EEBS) connected to a mobile telecommunication network via a concentration gateway, wherein the EEBS is a home base station, the method comprising:
   regularly transmitting, during a regular operation mode, a reference signal and system information, wherein the system information comprises a closed subscriber group (CSG) identity (CSG ID);
   paging, during the regular operation mode, for one or more user equipments (UEs) that belong to a CSG associated with the CSG ID;
   responsive to receiving no response to the paging by a UE that belongs to the CSG, entering a sleep mode, wherein the home base station transmits the reference signal and the system information less frequently than during the regular operation mode;
   responsive to a transmission by the home base station during sleep mode, receiving a wake-up command from a UE based on a determination that the sleep mode transmission matches a fingerprint of the home base station; and
   leaving the sleep mode responsive to the wake-up command.

2. The method of claim 1, further comprising initiating the paging responsive to detecting no activity by UEs that belong to the CSG at the home base station.

3. The method of claim 2, wherein detecting no activity comprises detecting an absence of reception of keep-alive messages from UEs that belong to the CSG.

4. The method of claim 1, wherein the concentration gateway is a home base station gateway, and wherein the method further comprises receiving a trigger to initiate the paging from the home base station gateway.

5. The method of claim 1, wherein further comprising initiating the paging responsive to expiration of a timer of the home base station.

6. The method of claim 1, further comprising receiving information from an operation, maintenance, administration and provisioning (OMA&P) node associated with the mobile telecommunication network identifying UEs that belong to the CSG.

7. The method of claim 1, wherein entering the sleep mode includes switching off radio parts of the home base station.

8. The method of claim 1, wherein entering the sleep mode includes switching off a backhaul connection to the concentration gateway.

9. The method of claim 1, further comprising
   returning to the sleep mode after a predetermined time, wherein the predetermined time is synchronized with the UE that sent the wake-up command.

10. The method of claim 9, further comprising deriving the predetermined time from the CSG ID.

11. The method of claim 1, wherein paging comprises transmitting a CSG paging type indicator that indicates that all UEs that have the CSG ID listed as an allowed CSG are requested to respond to the paging.

12. The method of claim 1, wherein transmitting the reference signal and the system information less frequently than during the regular operation mode comprises transmitting at least the system information according to a periodicity or timing that is derived from the CSG ID, and therefore determinable by the UEs that belong to the CSG associated with the CSG ID.

13. The method of claim 1, wherein the system information further comprises a discontinuous reception (DRX) parameter, and wherein paging comprises paging at a timing based on the DRX parameter.

14. A method in a user equipment (UE) that is configured to operate in a mobile telecommunication network that includes energy efficient base stations (EEBSs) that are home base stations that selectively operate in a sleep mode in which they transmit reference signal and system information, but less frequently than during regular operation, said method comprising:
   when the UE is in an idle mode, discovering a home base station, associated with a Closed Subscriber Group (CSG) of the UE, that is in sleep mode by prolonging a search used by the UE to identify the home base station, and sending an indication to the mobile telecommunication network that it should wake up the discovered home base station; and
   when the UE is in a connected mode:
      detecting transmissions from one or more other base stations within a vicinity of a home base station associated with a CSG of the UE;
      determining that the transmissions match a fingerprint that is associated with the home base station; and
      sending an indication to the mobile telecommunication network that it should wake up the home base station.

15. The method of claim 14, wherein, when the UE is in the idle mode, the prolonged search is performed by the UE in response to detecting transmissions from one or more other base stations within a vicinity of a home base station associated with a CSG of the UE and determining that the transmissions match a fingerprint that is associated with the home base station.

16. The method of claim 14, wherein the prolonged or intensified search is initiated periodically.

17. The method of claim 14, wherein the prolonged or intensified search is initiated manually by a user of the UE.

18. The method of claim 14, further comprising sending keep alive messages at regular intervals to a home base station associated with a CSG of the UE when camping on the home base station, to thereby prevent the home base station from entering the sleep mode.

19. The method of claim 14, further comprising sending a wake-up cancellation message to the home base station via the mobile telecommunication network.

20. The method of claim 14, further comprising predicting when to listen for transmissions from a home base station associated with a CSG of the UE according to a timing derived from a CSG identity (CSG ID).

21. An energy efficient base station (EEBS) connectable to a mobile telecommunication network via a concentration gateway, wherein the EEBS is a home base station, said home base station comprising at least one processor configured to:
   regularly transmit, via a transmitter during a regular operation mode, a reference signal and system information, wherein the system information comprises a closed subscriber group (CSG) identity (CSG ID);
   page, via the transmitter during the regular operation mode, for one or more user equipments (UEs) that belong to a CSG associated with the CSG ID;
   responsive to receiving no response to the paging by a UE that belongs to the CSG, enter a sleep mode, wherein the home base station transmits the reference signal and the system information, but less frequently than during the regular operation mode;
   responsive to a transmission by the home base station during sleep mode, receive a wake-up command from a UE based on a determination that the sleep mode transmission matches a fingerprint of the home base station; and
   leave the sleep mode responsive to the wake-up command.

22. The home base station of claim 21, wherein the at least one processor is configured to initiate the paging responsive to detecting no activity at the home base station by a UE that belongs to the CSG.

23. The home base station of claim 21, wherein the at least one processor is configured to:
   return the home base station to the sleep mode after a predetermined time,
   wherein the predetermined time is synchronized with the UE that sent the wake-up command.

24. A User Equipment (UE) configured for use in a mobile telecommunication network that includes macro base stations and at least one energy efficient base station (EEBS) that is a home base station that is configured to selectively enter a sleep mode during which the home base station transmits its reference signal and system information, but less frequently than during regular operation of the home base station, and wherein the UE comprises:
   one or more processors that are configured to at least one of:
      discover a home base station, associated with a Closed Subscriber Group (CSG) of the UE, that is in the sleep mode based on prolonging a search performed by the UE to identify the home base station associated with a CSG of the UE; and
      detect transmissions from one or more other base stations within a vicinity of a home base station associated with a CSG of the UE, and determine that the transmissions match a fingerprint that is associated with the home base station; and
   said UE further comprising a transmitter configured to send an indication to the mobile telecommunication network that it should wake up the home base station.

25. The UE of claim 24, wherein the one or more processors are configured to perform the prolonging of said search in response to detecting transmissions from one or more other base stations within a vicinity of a home base station associated with a CSG of the UE, and determining that the transmissions match a fingerprint that is associated with the home base station.

26. The UE of claim 24, wherein the one or more processors are configured to initiate the search periodically.

27. The UE of claim 24, wherein the transmitter is configured to send keep alive messages at regular intervals to a home base station associated with a CSG of the UE when camping on one of the cells of the home base station, to prevent the home base station from entering the sleep mode.

28. The UE of claim 24, wherein the transmitter is configured to send a wake-up cancellation message to the home base station, via the mobile telecommunication network.

* * * * *